United States Patent
Vazan

(10) Patent No.: US 7,119,825 B2
(45) Date of Patent: Oct. 10, 2006

(54) PARALLEL BEAM TO BEAM POWER CORRECTION

(75) Inventor: Shahriar Vazan, Northridge, CA (US)

(73) Assignee: Xerox Corporation, Stamford, CT (US)

(*) Notice: Subject to any disclaimer, the term of this patent is extended or adjusted under 35 U.S.C. 154(b) by 357 days.

(21) Appl. No.: 10/762,178

(22) Filed: Jan. 21, 2004

(65) Prior Publication Data

US 2005/0157155 A1    Jul. 21, 2005

(51) Int. Cl.
    *B41J 2/45* (2006.01)
(52) U.S. Cl. ............................ 347/236; 347/133
(58) Field of Classification Search ............ 347/233, 347/236, 130, 132, 133
    See application file for complete search history.

(56) References Cited

U.S. PATENT DOCUMENTS

| | | | |
|---|---|---|---|
| 4,751,377 A | 6/1988 | Ishizaka et al. ............. 250/205 |
| 4,796,265 A | 1/1989 | Asada et al. | |
| 5,151,718 A * | 9/1992 | Nelson ........................ 347/130 |
| 5,165,074 A | 11/1992 | Melino ........................ 358/481 |
| 5,432,537 A | 7/1995 | Imakawa et al. | |
| 5,461,413 A | 10/1995 | Askinazi et al. ............. 347/243 |
| 5,917,534 A * | 6/1999 | Rajeswaran .................. 347/238 |
| 5,956,070 A | 9/1999 | Paoli et al. .................. 347/241 |
| 6,121,983 A | 9/2000 | Fork et al. ................... 347/134 |
| 6,603,498 B1 | 8/2003 | Konnunaho et al. | |
| 2005/0157160 A1* | 7/2005 | Vazan ........................ 347/238 |

FOREIGN PATENT DOCUMENTS

| | | |
|---|---|---|
| EP | 0 710 005 A2 | 5/1996 |
| EP | 0 829 933 A2 | 3/1998 |

* cited by examiner

*Primary Examiner*—Huan Tran
(74) *Attorney, Agent, or Firm*—Christopher D. Wait

(57) ABSTRACT

An electro-optical system for adjusting beam to beam power non-uniformity in a multi-beam scanning system is disclosed. The electro-optical system consists of N×M array of light beams and N×M array of photodetectors wherein optical means deflect the light beams onto a photodetector array. A circuit consisting of N×M array of programmable laser drivers programmed with uniformity values for each light beam and having an N×M array of feedback loops is used to adjust the power intensity of each beam through the programmable laser drivers wherein each programmable laser driver uses the photodetector array summed with non-linearity inputs to adjust for beam to beam power uniformity correction.

20 Claims, 4 Drawing Sheets

PARALLEL BEAM TO BEAM POWER CORRECTION

CROSS-REFERENCE TO RELATED APPLICATION

Attention is directed to copending application Ser. No. 10/762,179, entitled, "Parallel Beam to Beam Uniformity Correction" filed concurrently herewith. The disclosure of this copending application is hereby incorporated by reference in its entirety.

BACKGROUND

The present invention relates generally to the field of optical imaging. More specifically, the invention relates to xerographic printers and, more particularly, to xerographic printers that incorporate a Vertical Cavity Surface Emitting Laser (VCSEL) array whose output is corrected by beam intensity variations through the use of process control electronics.

Polygon Raster Output Scanner (ROS) printers typically consist of a modulating laser light source, a polygon scanning beam deflector, an optical system of lenses and mirrors, a xerographic marking engine and the electronics to control printer operation. The ROS is positioned in an optical scan system to write an image on a moving photoreceptor surface. In the ROS system, a modulated beam is directed onto the facets of a rotating polygon mirror, which then sweeps the reflected beam across the photoreceptor surface. Each sweep exposes a raster line to a linear segment of a video signal image.

However, the use of a rotating polygon mirror presents several inherent problems. Bow and wobble of the beam scanning across the photoreceptor surface result from imperfections in the mirror or even slight misangling of the mirror or from the instability of the rotation of the polygon mirror. These problems typically require complex, precise and expensive optical elements between the light source and the rotating polygon mirror and between the rotating polygon mirror and the photoreceptor surface. Additionally, optically complex elements are also needed to compensate for refractive index dispersion that causes changes in the focal length of the imaging optics of the ROS.

The modulating laser light source may consist of a Vertical Cavity Surface Emitting Laser (VCSEL) array. The VCSEL array may be either a one or two-dimensional array of individual laser sources. Each individual laser source in the VCSEL array has a corresponding drive circuit which may be used to generate a beam to expose a corresponding area on a moving photoreceptor in response to video data information applied to the drive circuits of the VCSEL array. The photoreceptor is advanced in the process direction to provide a desired image by the formation of sequential scan lines generated by the beam to beam exposure delivered from the VCSEL array.

Current beam to beam uniformity correction in multi-beam ROS systems multiplexes one photo detector and one loop-back system among all the beams. This is accomplished by sequentially selecting each beam and comparing the output of the photo detector for that beam with a "reference" to decide whether to increase or decrease the power intensity in the selected beam. This sequential detection and power adjustment process takes a few microseconds per beam. In a high performance multi-beam ROS system the beam to beam uniformity correction has to be fine-tuned for each beam per scan line. In a VCSEL ROS system incorporating a two-dimensional array for producing a plurality of beams, the sequential beam to beam uniformity correction may take up to a few hundred micro-seconds. This uniformity correction scheme presents an amount of delay time for each line to be printed such that it renders the sequential multiplexing of all the beams unusable for high speed/high performance platforms.

SUMMARY

An electro-optical system for adjusting beam to beam power non-uniformity in a multi-beam scanning system is disclosed. The electro-optical system consists of N×M array of light beams and N×M array of photodetectors wherein optical means deflect the light beams onto a photodetector array. A circuit consisting of N×M array of programmable laser drivers programmed with uniformity values for each light beam and having an N×M array of feedback loops is used to adjust the power intensity of each beam through the programmable laser drivers wherein each programmable laser driver uses the photodetector array summed with non-linearity inputs to adjust for beam to beam power uniformity correction.

BRIEF DESCRIPTION OF THE DRAWINGS

The drawings are not to scale and are only for purposes of illustration.

DETAILED DESCRIPTION

A multi-beam scanning system comprising an array of light sources each having a programmable reference mechanism or driver programmed with calibrated uniformity values for producing a corresponding light beam for producing a corresponding power intensity of light beams is described. The multi-beam scanning system includes a beam splitter to deflect the light beams onto a photodetector array wherein an array of feedback loops simultaneously adjust the power intensity in the fast/slow scan direction for each light beam by using the programmable reference mechansims or drivers. Each programmable driver uses a photodetector on the photodetector array to adjust for parallel beam to beam power correction produced from the array of light sources.

Figure 1:
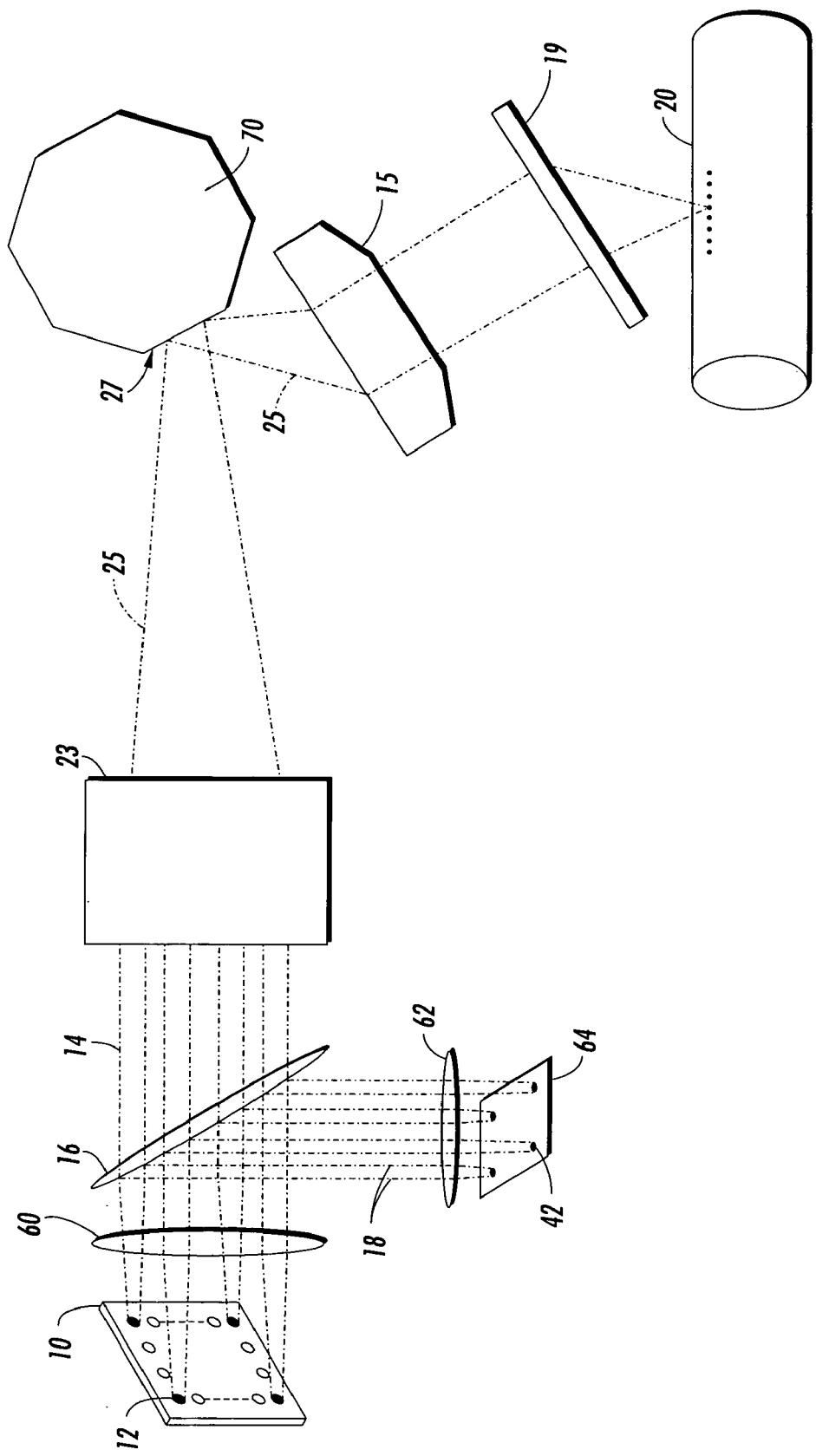
FIG. 1 is a schematic view of a ROS printing system utilizing a Vertical Cavity Surface Emitting Laser array.

Reference is now made to FIG. 1 wherein there is shown a schematic view of a ROS printing system incorporating an optical source 10. The optical source may be either a one or two-dimensional array of light sources each light source producing light beams of unequal power intensity. The optical source 10 shown is a two dimensional N×M laser array 10 of Vertical Cavity Surface Emitting Lasers (VCSELs), all emitting nominally the same wavelength and same polarization state. The individual VCSELs 12 in the VCSEL N×M array 10 are arranged vertically and horizontally in each scan plane direction with equal center to center spacing between the individual VCSELs 12. The VCSEL N×M array 10 may be monolithic in one embodiment wherein "N" and "M" may be any combination of integer values greater than zero to describe the two-dimensional array.

Returning to the line projection architecture of the ROS printing system shown in FIG. 1, the VCSELs 12 each emit beams 14 through a collimator lens 60 wherein the beams 14 pass through a beam splitter or mirror 16 and then through a pre-polygon lens system 23. The lens system 23 focuses the beams 14 into a controlled energy distribution beam 25 that is reflected from the mirrored facets 27 of a rotating polygon scanner 70. With the rotation of polygon 70, the light beam 25 is reflected from each illuminated facet 27 and passes through a series of post-polygon lenses 15 and 19, respectively, which scans the beam 25 across a surface of a photoreceptor 20.

Figure 2:
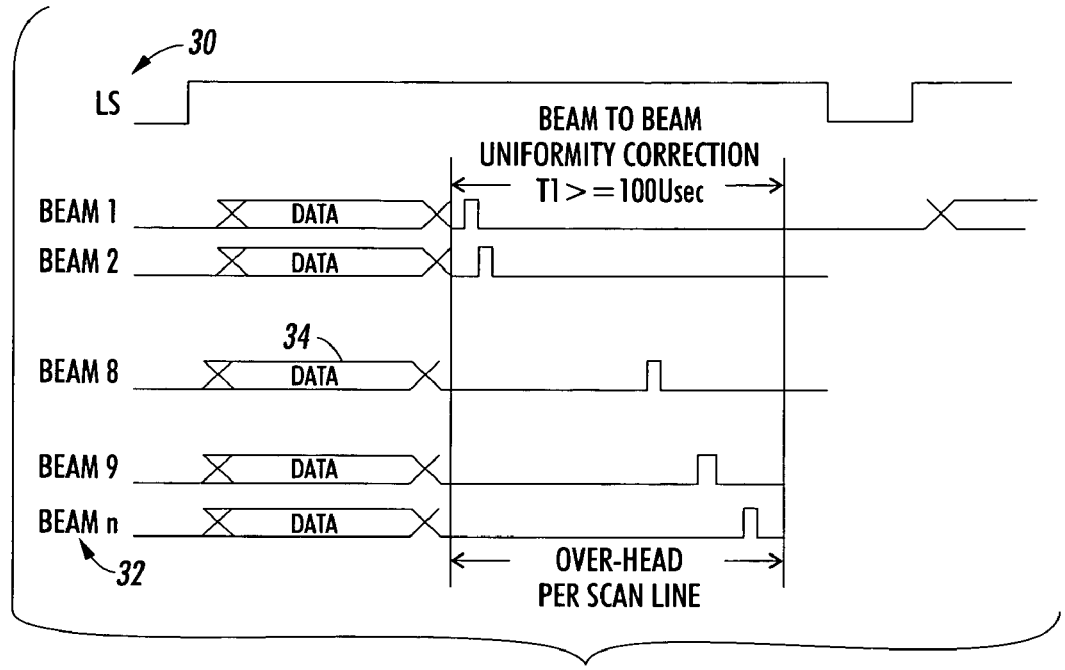
FIG. 2 is a prior art timing diagram illustrating the amount of delay time using sequential correcting for beam to beam uniformity.
Figure 3:
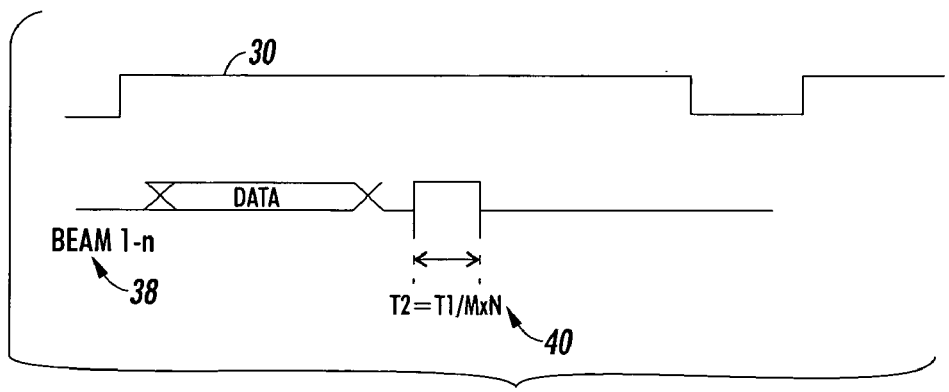
FIG. 3 is a timing diagram illustrating the amount of delay time using parallel beam to beam uniformity correction.

Referring now to FIG. 2, there is shown a prior art timing diagram illustrating the amount of delay time using sequential correcting for beam to beam uniformity. Beam to beam uniformity correction in multi-beam ROS systems multiplexes one photo detector and one loop-back system among all the beams. This may be accomplished by sequentially selecting each beam 32 and comparing the output of a photo detector for that beam with a "reference" to decide whether to increase or decrease the power intensity in the selected beam 32. As shown in FIG. 2, a sequential detection and power adjustment process may take greater than 100 microseconds for beam to beam correction during line synchronization 30. What would be desirable is a parallel detection and power adjustment scheme. As shown in FIG. 3 using parallel beam to beam uniformity correction reduces the time 40 to that of adjusting the power correction for an individual VCSEL beam 14 when calibrating and adjusting for all the beams 38 during the line synchronization operation 30.

Turning back to FIG. 1, each individual beam 14 from each individual VCSEL 12 is split by the beam splitter 16 for generating a beam 18 for passing through an imaging lens 62 for receipt on an photo detector plane 64 having photo detectors 42. The photo detector plane 64 has the photo detectors 42 arranged in a N×M array to match the corresponding VCSELs 12 on the VCSEL N×M array 10. All the VCSELs in the N×M array 10 may now be addressed at the same time in parallel on the photo detector plane 64. The output of each photo detector 42 may now be used for each beam 18 corresponding to a beam 14 from the VCSEL array 10 as a "reference" to decide whether to increase or decrease the power intensity for a given selected VCSEL 12.

Figure 5:
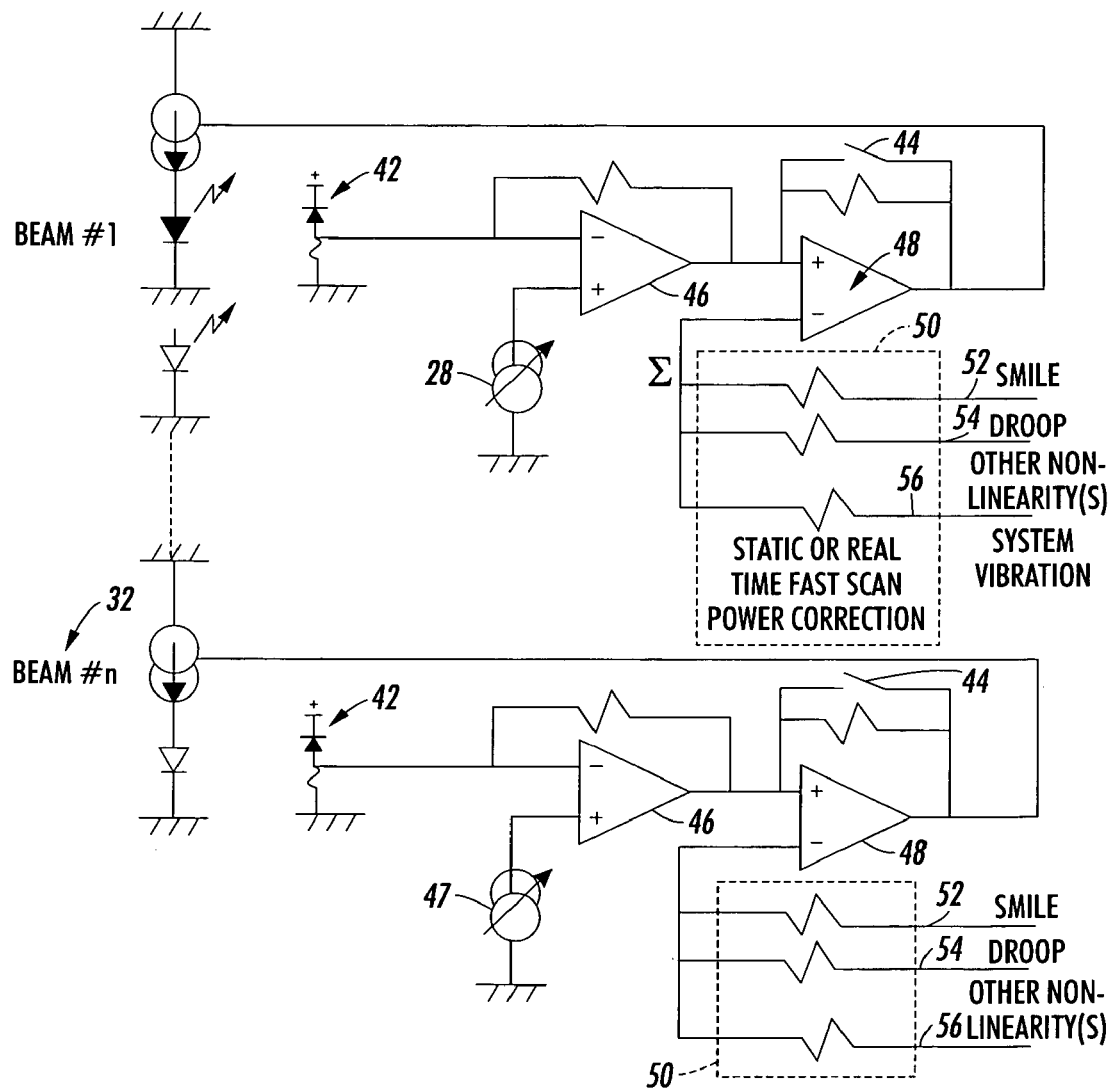
FIG. 5 is a simplified circuit diagram for calibrating and providing parallel beam to beam uniformity and power correction for the Vertical Cavity Surface Emitting Laser array in the ROS printing system shown in FIG. 1.

FIG. 5 is a simplified circuit diagram for calibrating and providing parallel beam to beam uniformity and power correction for a VCSEL ROS of N×M array beams using the architecture shown in FIG. 1. The following is one method in embodiments that may be used to calibrate the multi-beam VCSEL array 10 for parallel beam to beam uniformity correction. One method used to obtain calibration values is to first turn all the beams 32 "ON" and close the switch S1 44 shown in FIG. 5. Next, the intensity of each beam 18 at the photo detector plane 64 is either manually or automatically calibrated for a nominal value on the surface of the photoreceptor 20 through use of a programmable uniformity control reference mechanism or driver. The programmable uniformity control reference mechanism or driver may be in one embodiment an eight "8" bit digital to analog (D to A) converter 28 that varies the amount of current into each light source for varying the intensity of each corresponding light beam produced. A photo detector 42 is used to measure the output power intensity of each beam 18 for the corresponding beam 14. Therefore, each VCSEL 12 has a corresponding calibrated D to A converter 47 used to uniformly adjust the intensity of each beam 14 such that they are all of equal strength.

Figure 4:
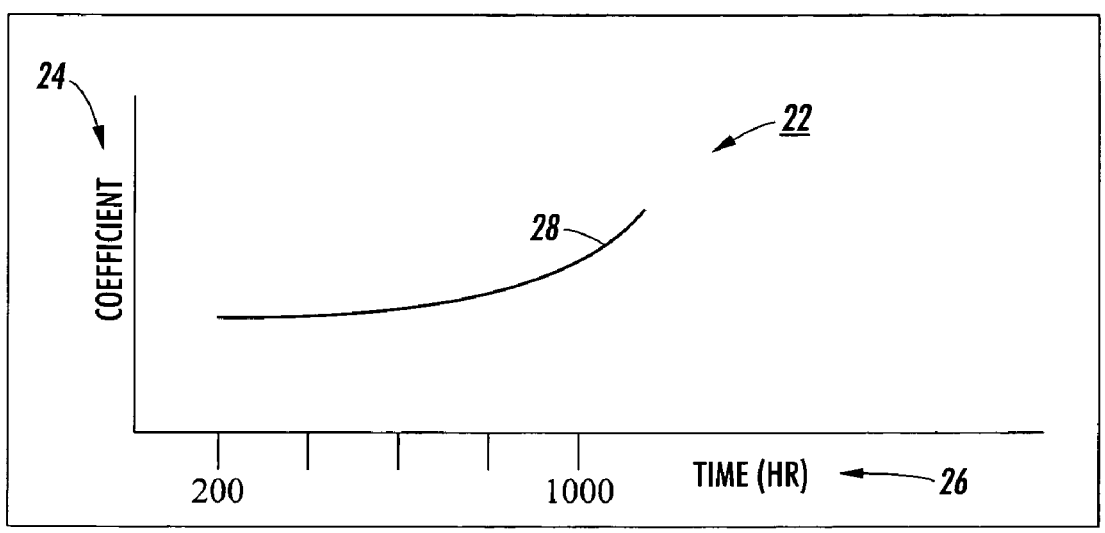
FIG. 4 is a graph showing a correction coefficient curve which may be used for long term power compensation.

The calibrated uniformity values corresponding to each beam may be stored in a non-volatile memory location. FIG. 4 illustrates a graph showing one example of a correction coefficient curve for long term power compensation wherein the uniformity values may be modified to compensate for long term aging of the VCSELs 12 at predetermined intervals. This may be determined through cycle testing during machine set-up time, or by multiplying the uniformity values by a time varying empirically/mathematically derived coefficient to compensate for long term power compensation. The correction coefficient may also be implemented within the D to A converters as part of the calibration process and for real time operation as described below.

Referring once again to FIG. 5, for real time operation, the calibrated uniformity reference values for each beam are set by loading these values into the D to A converters 28 through 47 for each beam during machine set-up time. Next, switch S1 44 is closed simultaneously for each VCSEL 12 to establish a closed loop for beam to beam uniformity correction. Summing amplifier 46 uses the value from the photo detectors 42 and sums it with the different reference values stored in each of the D to A converters. By dedicating one cycle time, ≈2 Usec or less, per scan line, parallel beam to beam uniformity correction is achieved. More specifically, during this cycle, all beams are turned to "ON" and the closed-loop automatically modifies the light intensity of each beam to match that of the reference value. This reduces the existing sequential/serial approach to the power adjustment of the light beams from an unacceptable level of a few hundred Usec per line to approximately 2 Usec per line or lower which provides a manageable overhead in very high performance imaging applications.

For real time parallel beam to beam power correction in the fast/slow scan direction the following method in embodiments may be implemented. As described above, the reference value for each beam is set by loading uniformity values into the D to A converters 28 during machine set-up time. Next, a closed-loop is once again established by closing switch S1 44 and dedicating one cycle time, ≈2 Usec or less, per scan line for parallel beam to beam static power correction, i.e., loading a new value of a Smile 52 correction value into the corresponding input.

Real time/dynamic power correction 50 in the fast/slow scan direction may be implemented by driving other inputs into a summing amplifier 48 as depicted in FIG. 5. These inputs could represent Droop 54 or other system non-linearity(s) 56 like vibration that may be corrected by modulating the beam intensity statically or dynamically.

The invention may be embodied in other specific forms without departing from its spirit or essential characteristics. The described embodiments are to be considered in all respect only as illustrative and not restrictive. The scope of the invention is, therefore, indicated by the appended claims, rather than by the foregoing description. All changes which come within the meaning and range of equivalency of the claims are to be embraced within their scope.

What is claimed is:

1. A multi-beam scanning system, comprising:
    an array of light sources each having a programmable driver programmed with calibrated uniformity values for producing a corresponding light beam;

an array of photodetectors;
a beam splitter for deflecting said light beams onto said photodetector array; and
an array of feedback loops for simultaneously adjusting beam power intensity in a fast/slow scan direction using said programmable drivers for each said light beam wherein each said programmable driver uses said photodetector array as a reference source summed with non-linearity inputs to adjust for parallel beam to beam power correction produced by said array of light sources.

2. The multi-beam scanning system according to claim 1, wherein said programmable drivers uses smile value input in said feedback loop for varying an amount of current into each said light source for adjusting said beam power intensity.

3. The multi-beam scanning system according to claim 1, wherein said programmable drivers uses droop value input in said feedback loop for varying an amount of current into each said light source for adjusting said beam power intensity.

4. The multi-beam scanning system according to claim 1, wherein said programmable drivers uses system vibration input in said feedback loop for varying an amount of current into each said light source for adjusting said beam power intensity.

5. The multi-beam scanning system according to claim 1, wherein said programmable drivers uses system non-linearity inputs in said feedback loop for modulating said beam power intensity statically.

6. The multi-beam scanning system according to claim 1, wherein said programmable drivers uses system non-linearity inputs in said feedback loop for modulating said beam power intensity dynamically.

7. A method, comprising:
generating a plurality of light beams from an array of light sources using predetermined calibration values stored in programmable drivers;
splitting said plurality of light beams through a beam splitter for receipt on a photodetector plane having an array of photodetectors;
measuring output power for each light beam using a photodetector; and
adjusting an intensity for each said light beam simultaneously in a fast/slow scan direction through an array of feedback loops using said programmable drivers wherein each programmable driver uses said photodetector array as a reference source summed with non-linearity inputs to adjust for beam to beam power correction produced by said array of light sources.

8. The method according to claim 7, further comprising:
varying an amount of current into each said light source for adjusting said beam power intensity by said programmable drivers using a smile input.

9. The method according to claim 8, wherein said array of feedback loops further comprising:
varying an amount of current into each said light source for adjusting said beam power intensity by said programmable drivers using a droop input.

10. The method according to claim 9, further comprising:
varying an amount of current into each said light source for adjusting said beam power intensity by said programmable drivers using a system vibration input.

11. The method according to claim 8, further comprising:
varying an amount of current into each said light source for adjusting said beam power intensity by said programmable drivers using system non-linearity inputs.

12. The method according to claim 8, further comprising:
modulating an amount of current into each said light source for adjusting said beam power intensity statically.

13. The method according to claim 7, further comprising:
modulating an amount of current into each said light source for adjusting said beam power intensity dynamically.

14. A printer, comprising:
an N×M array of laser sources each having a programmable laser driver programmed with uniformity values for producing a light beam;
an N×M array of photodetectors;
optical means to deflect said light beams onto said photodetector array; and
an N×M array of feedback loops to simultaneously adjust an intensity for each beam in parallel in a fast/slow scan direction through each said programmable laser driver wherein each programmable laser driver uses said photodetector array summed with non-linearity inputs to correct for beam to beam power correction.

15. The printer according to claim 14, wherein said programmable laser driver uses a smile input for varying an amount of current into each light beam.

16. The printer according to claim 14, wherein said programmable laser driver uses a droop input for varying an amount of current into each light beam.

17. The printer according to claim 14, wherein said programmable laser driver uses a system vibration input for varying an amount of current into each light beam.

18. The printer according to claim 14, wherein said programmable laser drivers modulates each light beam statically for producing parallel uniform beam to beam light intensity.

19. The printer according to claim 14, wherein said programmable laser driver modulates each light beam dynamically for producing parallel uniform beam to beam light intensity.

20. The printer according to claim 14, wherein said N×M array of light beams is a vertical cavity surface emitting laser array.

* * * * *